United States Patent

Hull

[19]

[11] Patent Number: 5,832,110
[45] Date of Patent: Nov. 3, 1998

[54] IMAGE REGISTRATION USING PROJECTION HISTOGRAM MATCHING

[75] Inventor: Jonathan J. Hull, Cupertino, Calif.

[73] Assignees: Ricoh Company, Ltd., Tokyo, Japan; Ricoh Corporation, Menlo Park, Calif.

[21] Appl. No.: 654,360

[22] Filed: May 28, 1996

[51] Int. Cl.[6] .................................................. G06K 9/00
[52] U.S. Cl. .......................... 382/168; 382/289; 382/294
[58] Field of Search .................................... 382/168, 171, 382/174, 113, 289, 290, 294, 296, 297, 235, 245

[56] References Cited

U.S. PATENT DOCUMENTS

5,001,766   3/1991   Baird ........................................ 382/290
5,581,637   12/1996   Cass et al. ................................ 382/294

Primary Examiner—Phuoc Tran
Attorney, Agent, or Firm—Philip H. Albert; Townsend and Towsend and Crew

[57] ABSTRACT

Image registration is performed by reducing images to histograms, rotating histograms to register the histograms, then using the registration of the histograms to register the images, thereby registering images with less computation than image rotation. Where the image is compressed using line-by-line run length encoding, the histogram can be derived from the run length encoding without decompression. Histogram rotation can also be used for skew angle detection.

15 Claims, 5 Drawing Sheets

Point Matching: θ =-1.3°, y=-7 pixels
Histogram Matching: θ =-1.1°, y=-6 pixels

Fig. 5

IMAGE REGISTRATION USING PROJECTION HISTOGRAM MATCHING

BACKGROUND OF THE INVENTION

The present invention relates to the field of document processing. More specifically, in one embodiment the invention provides for improved registration of image fragments.

Registration is a process of aligning two image fragments of the same object and is typically used to align various image fragments into a larger image whole. There are many applications for image registration, such as assembling mosaics of aerial photographs, stereo image processing for 3-dimensional model constructions, target recognition, medical diagnosis and multi-pass scanning or copying of documents.

Two images can be manually registered relative to each other by aligning portions of the images which overlap. To accomplish this, a person views both images and visually identifies features near an edge of one image and the same features in the second image, and then aligns the two images accordingly. Manual registration has many disadvantages, among which is that it is labor intensive and slow.

An automatic image registration system accepts two digitized image fragments as its input and outputs the parameters of a transformation, T, which maps points of one image fragment onto corresponding points in the other. Several methods of automatic image registration are known. See, for example, L. G. Brown, "A Survey of Image Registration Techniques," *ACM Computing Surveys* 24, 4 (December 1992), pp. 325–376. Among the major variations of registration methods are correlation, point mapping, Fourier methods and elastic model-based matching. The registration method used is typically chosen based on the particular application, the type of transformation expected and the expected noise.

One prior art method of obtaining the registration of two images $I_1$ and $I_2$ uses a measure called normalized cross-correlation described by the following equation:

$$C(u,v) = \frac{\sum_x \sum_y I_1(x,y) \cdot I_2(x-u, y-v)}{\sqrt{\sum_x \sum_y I_2^2(x-u, y-v)}} \quad (1)$$

The normalized cross correlation C measures how well two images $I_1$ and $I_2$ match each other when $I_2$ is translated by u in x and v in y with respect to $I_1$. At each such translation, the product of the two images is calculated. The normalized cross correlation reaches its maximum value when the two images are translated such that one precisely matches the other. While a document image registration algorithm that uses this method can produce accurate results, it does so at a substantial run-time cost in computation in computing the normalized cross correlation. That is, for each candidate translation the product of two-dimensional images must be calculated. Furthermore, this method does not take into account relative rotations of the images.

In addition to the substantial computational cost, this method also has a significant memory cost, as it requires that at least one of the images be entirely stored in memory while the feature points are calculated. It is therefore desirable to develop a registration method which overcomes the need for finding local feature points using a convolution mask and which doesn't require a memory to store an entire image.

One image registration system in the prior art uses a hybrid approach. See for example, U.S. patent application Ser. No. 08/527,826, filed Sep. 13, 1995, entitled "Simultaneous Registration of Multiple Image Fragments." With the hybrid approach, a user is presented with multiple scans of a document and the user manually provides an approximate registration using a drag-and-drop interface. The registration system then processes the overlapping image fragments with the assumption that the alignment is fairly close. The effect of the rough alignments supplied by the user is to reduce the number of possible transformations to allow for quicker registration. However, this hybrid approach still requires manual intervention.

From the above it is seen that an improved automated image registration system is needed.

SUMMARY OF THE INVENTION

An improved image registration system is provided by virtue of the present invention. In one embodiment of an image registration system according to the present invention, a horizontal projection histogram is calculated from a first image fragment and compared to a horizontal histogram from a second image fragment. By manipulating the two histograms until they are "aligned," the rotation ($\theta$) and vertical translation (y) parameters of the transformation are determined. Knowing these two parameters, the horizontal translation (x) parameter is easily calculated by sliding the image fragments relative to each other horizontally. In one variation, vertical histograms are used to determine the rotation and horizontal translation first. Because the histograms are being manipulated and not the entire image fragments, much less computational effort and memory are needed to perform image registration. Instead of rotating an image to determine the transformation's angle of rotation, the histograms are transformed according to a "histogram rotation" transformation. If the application of the image registration is such that the image fragments are not expected to be rotated relative to each other through large angles, the histogram rotation and alignment process is sufficient. Where a substantial chance exists that an image fragment has been relatively rotated through a large angle, or the image fragments are not amenable to the histogram rotation approach, an image registration system might include a backup process to do a more brute force image registration process should the histogram rotation transformation process fail to achieve a lock.

In a system with run length encoded (RLE) compressed images, where each row is described by a sequence of run lengths, a horizontal histogram can be generated without fully decompressing the image. This is accomplished by counting the number of pixels in each of the run lengths for the color of the pixel being included in the histogram. Typically, the histogram counts the number of black pixels per row.

While histogram rotation is useful for aligning two or more image fragments, it is also useful for determining a skew angle of an image which comprises a substantial number of parallel objects, such as a lined drawing or lines of text. To determine a possible angle of skew, a histogram is generated and then rotated to maximize a sharpness factor. The angle of the rotated histogram having the highest sharpness factor is assumed to be the angle of skew.

A further understanding of the nature and advantages of the inventions herein may be realized by reference to the remaining portions of the specification and the attached drawings.

DESCRIPTION OF THE PREFERRED EMBODIMENTS

The preferred embodiments for carrying out the invention will now be described, but first the definitions of several terms will be explained.

As is well known in the art, a digitized image can be represented by a two-dimensional array of pixel values. A binary image is an image represented by an array of pixels where only two possible pixel values are represented in the image. Each pixel value in a binary image can be thought of as having a value of "0" or "1". Where the binary image is a black and white image, "0" might represent white pixels and "1" represent black pixels. This is the set of pixel values which is used in this description to explain the invention, however it should be noted that the colors of the pixels are arbitrary, as they could refer just as well to binary images of red and blue pixels. It will be assumed for the purposes of illustration that the image fragments are binary images with image features (characters, lines, dots, etc.) drawn in black pixels on a white background.

The invention also works with multi-level images, where a pixel can take on a value from a set of more than two values, such as a 24-bit color image. Because multi-level images can require more computation than an equal size binary image in various processing stages, it is often desirable to create binary images from the multi-level images, saving the multi-level images, and manipulate the binary images instead. The registration of the binary images can then be used to register the saved multi-level images. Therefore, the invention can be described with reference to binary images without loss of generality.

Image registration is the process of aligning two image fragments where the image fragments overlap, i.e., where the image fragments have features in common. For example, a map book which has multiple pages (image fragments) to fully map a city might have each map page overlap adjacent map pages. If a large, continuous map of the city is desired, it could be constructed from the map pages by aligning adjacent map pages using the common, overlapping portions of the adjacent map pages in an image registration process. As used herein, a "full" image refers to the image resulting from registering and assembling image fragments. While it is generally assumed that a sufficiently large overlapping area is provided, the invention also works where minimal overlap (one inch or less at 300 dots per inch) is provided.

Image fragments are used in map books where carrying the full image would be unwieldy. Image fragments are also used where the full image is bigger than an aperture through which image fragments are captured, such as when a large drawing needs to be photocopied in several passes, or when a landscape needs to be photographed but multiple overlapping aerial photographs are required. Of course, image registration works regardless of how the image fragments came into being, so long as the image fragments overlap or have portions in common with identifiable features which can be registered from one image fragment to another.

While more than two image fragments can be registered together, it should be apparent after reading this description that registering more than two fragments can be done serially, i.e., by registering a first image fragment to a second image fragment, combining the first and second image fragments into a larger, intermediate image fragment, registering a third image fragment to the intermediate image fragment, and so on. For clarity, the invention is only described below as it applies to registering two image fragments.

In practice, the image fragments are fixed into a coordinate space, or more precisely, a coordinate plane. Typically, the location in the plane of each of the image fragments is dictated by how the images are formed. For example, where two image fragments are copier scans using an 8.5"×11" aperture and scanned at 600 dpi, resulting in a 5100 pixel by 6600 pixel array, the location of the upper left corner of the first image fragment might be (0,0) and the upper left corner of the second image might be (5100,0). The results of an image registration process applied to those two image fragments can be either an expression describing how to move the second image fragment in the plane relative to the first image fragment to bring them into alignment or the result could be a larger image fragment showing a seamless combination of the two image fragments. If the result is the expression, it is a straightforward process to transform the second image to align with the first.

The expression which brings the second image fragment into alignment is referred to herein as the transformation, T. It should be apparent that the choice of moving the second image fragment to match the first image fragment is an arbitrary choice and that, with the opposite transformation, the first image fragment would be brought into alignment with the second image fragment. Where the distinction is relevant to explaining the invention, the image fragment which is moved is designated as the "floating" image fragment and the other image fragment is designated as the "stationary" image fragment. In the most general case, transformation T comprises a rotation, translation in two directions (X, Y), scaling in two directions (Sx, Sy) and shearing in two directions (Shx, Shy). In a typical application, the scans are all made in the same plane so the scaling is 1:1 and shearing is not present, so it is sufficient to express the transformation as $T(\theta,x,y)$.

Herein, coordinates on the coordinate plane are described by an X-axis coordinate and a Y-axis coordinate. For simplicity, coordinates in the X and Y directions are measured in units of pixels, however the transform need not be an integral number of pixels. If a floating image fragment is transformed through a transformation of a non-integral number of pixels, well known approximation techniques, such as aliasing and the like, are used to account for the fact that pixels can only occur at integer coordinates.

Given the above conditions, the problem of image registration is the problem of examining two binary image fragments in a coordinate plane and determining the transformation parameters $\theta$, x, and y which would result in the alignment of the two image fragments in the coordinate plane.

Figure 1:
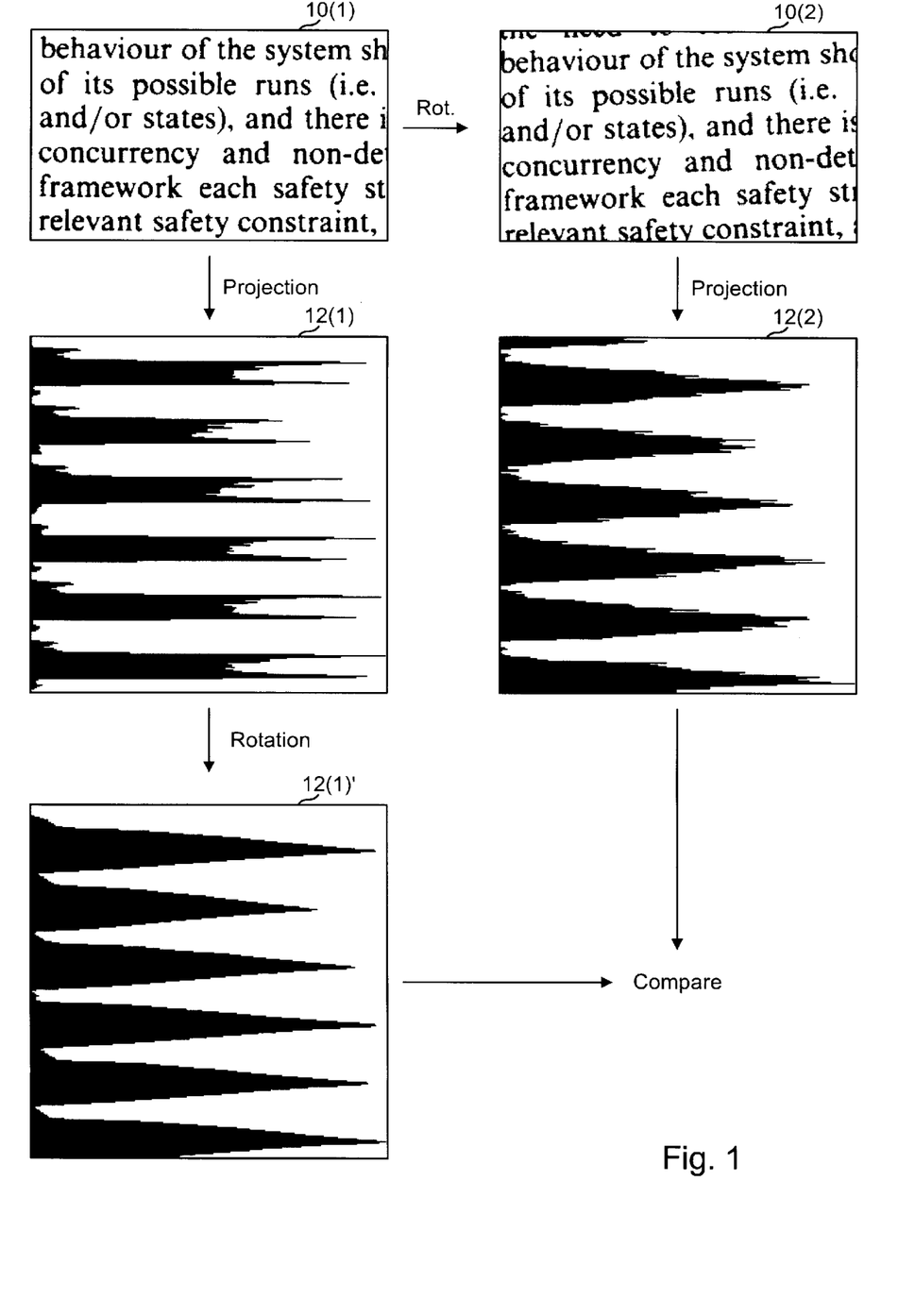
FIG. 1 shows examples of images, histograms, rotated images and rotated histograms.

FIG. 1 illustrates the process of histogram rotation and how it is used in the present invention. Two image fragments 10(1) and 10(2) are shown. These are the same image fragments except that they are rotated by 2 degrees relative to each other and translated as shown. Each of these image fragments can be projected onto a horizontal axis. Graphically, a horizontal histogram is the equivalent of sliding all the black pixels of an image down to the left of the image without overlapping other black pixels or changing rows. Histograms 12(1) and 12(2) result from projecting image fragments 10(1) and 10(2) respectively. "Rotating" histogram 12(1) as explained in connection with FIG. 4, by 2 degrees results in the rotated histogram 12(1)'. Rotated histogram 12(1)' is compared with histogram 12(2) to determine if 2 degrees is an accurate measure of the rotation of image fragments 10(1) and 10(2) relative to each other.

Figure 2:
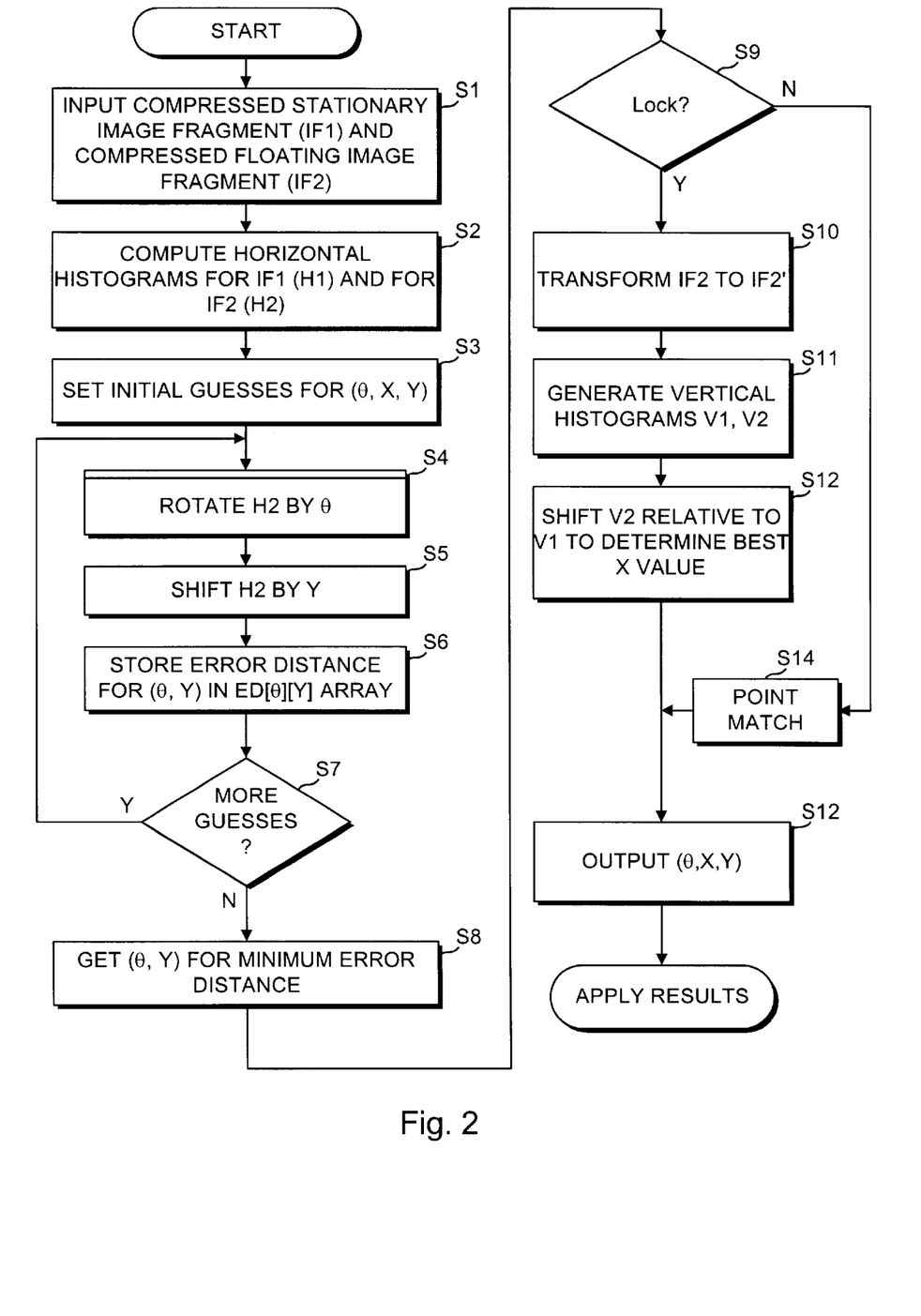
FIG. 2 is a flow chart describing an image fragment registration process.

Referring now to FIG. 2, a method of image registration according to the present invention is shown. In FIG. 2, each of the steps are labelled (S1, S2, etc.) and the steps are performed in the order labelled except where indicated otherwise. In step S1, two compressed image fragments, IF1 and IF2, are read. IF1 is arbitrarily designated the stationary image fragment and IF2 is arbitrarily designated the floating image fragment.

In step S2, horizontal projection histograms are generated for IF1 (histogram H1) and for IF2 (histogram H2). A horizontal histogram for a two-dimensional binary image array is simply a one-dimensional array of values indicating pixel counts for the image array, with one entry in the histogram for each row of pixels in the binary image. Assuming that the histogram is a histogram of the black pixels, the i-th entry in the histogram array is the number of black pixels in the i-th row of the binary image. Vertical histograms are generated in a similar manner, except the counts are of pixels in each column.

If an image fragment is compressed using run length encoding, it need not be decompressed to generate the histogram. A concrete example will show why this is the case. Suppose an image fragment is sixteen columns wide and a row has the following pixels: "0100111110010000". In the compressed image, this row would be represented by an expression similar to "01125214", where the first number indicates the color of the first pixel in the row and all subsequent numbers indicate the number of pixels in each run of the row. From the uncompressed row, it can clearly be seen that the row has seven black ("1") pixels. Knowing only the compressed representation "01125214", the number of black pixels is determined simply by adding every other number beginning with the second "1" (the initial "0" indicates that the first "1" is a run of one white pixel), resulting in 1+5+1, or 7, as the histogram entry for that row.

In step S3, initial guesses are made for the transformation parameters $\theta_i$ and $y_i$. A search space of $(\theta,y)$ pairs might also be determined at this step. Logically, a two-dimensional array, ED[ ][ ] is set up to hold error distances, whose contents is explained below.

In step S4, H2 is "rotated" by $\theta_i$ to generate a rotated histogram. The method of rotating a histogram is described below in connection with FIG. 4 and it is a method which simulates the generation of a histogram from a rotation of IF2 rotated through the angle $\theta_i$.

In step S5, H2 is shifted by $y_i$. Preferably, the values of y in the search space, including $y_i$, are integers so that translating H2 is as simple as changing the initial index into the one-dimensional array storing the values for H2. However, noninteger values can be used for $y_i$. If H2 is shifted by $(y_i+a)$, a particular cell in H2 gets its value from $(1-a)\,y_i+a y_i$ where $0<a<1$.

In step S6, H2 is compared with H1 and an error distance is calculated. One of several different error distances could be used. In one embodiment, the error distance is the sum of the squares of the differences between the histogram counts in corresponding rows of H2 and H1. This can be expressed as:

$$\sum_{k=1}^{L} (H2[k] - H1[k])^2 \quad (2)$$

where L is the number of rows (in the image fragments as well as in the histogram arrays). For simplicity, we assume that the number of rows in each of the image fragments IF1 and IF2 is the same. If it is not, rows can be temporarily ignored during the registration process so H1 and H2 have the same number of entries, namely L entries. Other error formulae can be used, such as where the exponent is replaced in Equation 2 with a number other than two.

Once the error distance is calculated, it is stored in the array ED at the location specified by ED[$\theta_i$][$y_i$]. In step S7, the next $(\theta,y)$ pair is obtained and the process loops back to step S4 until an error distance is calculated for each $(\theta,y)$ pair. Once all the error distances are calculated, the image registration process proceeds with step S8, where a minimum error value is found from the array ED. The $(\theta,y)$ pair which is the array index for the minimum error value is then used as the rotation and vertical translation parameters for the transformation T. Alternatively, the search process might be done more quickly by using results of a first set of error distance measurements to choose which promising $(\theta,y)$ pairs to pursue.

Either way, the image registration process continues after the index for the minimum error distance is found. Where multiple error distance values are near the minimum, more than one candidate $(\theta,y)$ pair might be carried forward to subsequent steps and be reduced to one best choice at a later step. The process described here has only one best choice being selected at this step.

If used, a test for a "lock" on image registration is performed at step S9, as explained below. If a lock is found, the process continues with step 10, where IF2 is transformed by the partial transformation, $T_p=T(\theta,0,y)$ to form a new image fragment IF2' from the parameters determined in step S8.

In step S11, vertical histograms V1 and V2 are generated for the image fragments IF1 and IF2', respectively, and in step 11, the vertical histograms V1 and V2 are shifted relative to each other to determine a best value for a horizontal translation parameter, x. As should be apparent from this description, IF1 could be transformed by $T_p$ to form IF1' instead of IF2 to IF2', to the same effect.

In step S13, the image registration process outputs the determined values for $\theta$, x and y which would transform IF2 into alignment with IF1. As should be apparent, IF1 and IF2 are interchangeable and either image fragment can be selected for transformation so long as the signs of the parameters are kept consistent.

Once the transformation parameters are output, a number of subsequent steps can be performed which are not shown in FIG. 2. For example, where the image transformation process is done in connection with a multi-pass copier, stored image fragments can be manipulated and printed as a single, registered image. The single registered image might also form input data for a character recognition process. Other uses for transformation parameters and image fragments will be apparent on application of the teachings of the present disclosure to a specific use.

In some uses, the image fragments are very amenable to a lock occurring in step S8. A lock occurs when an index is found which is near the actual true registration position of the image fragments. A lock is detected by comparing the minimum error distance to a threshold, where a lock is deemed to occur when the minimum error distance is less than the threshold. Odd shaped, unbalanced drawings where black pixels are very unevenly distributed across the columns may prove hard to lock. Where such image fragments are a common occurrence, an alternate, hybrid embodiment of the invention would prove useful. In this hybrid embodiment, image fragments are tested for a lock in step S9, and if no lock is found, conventional image registration is performed on the image fragments IF1, IF2 at step S14. Following step S14, all three transformation parameters are known, so the process flows to step S13, where the parameters are output.

Figure 3:
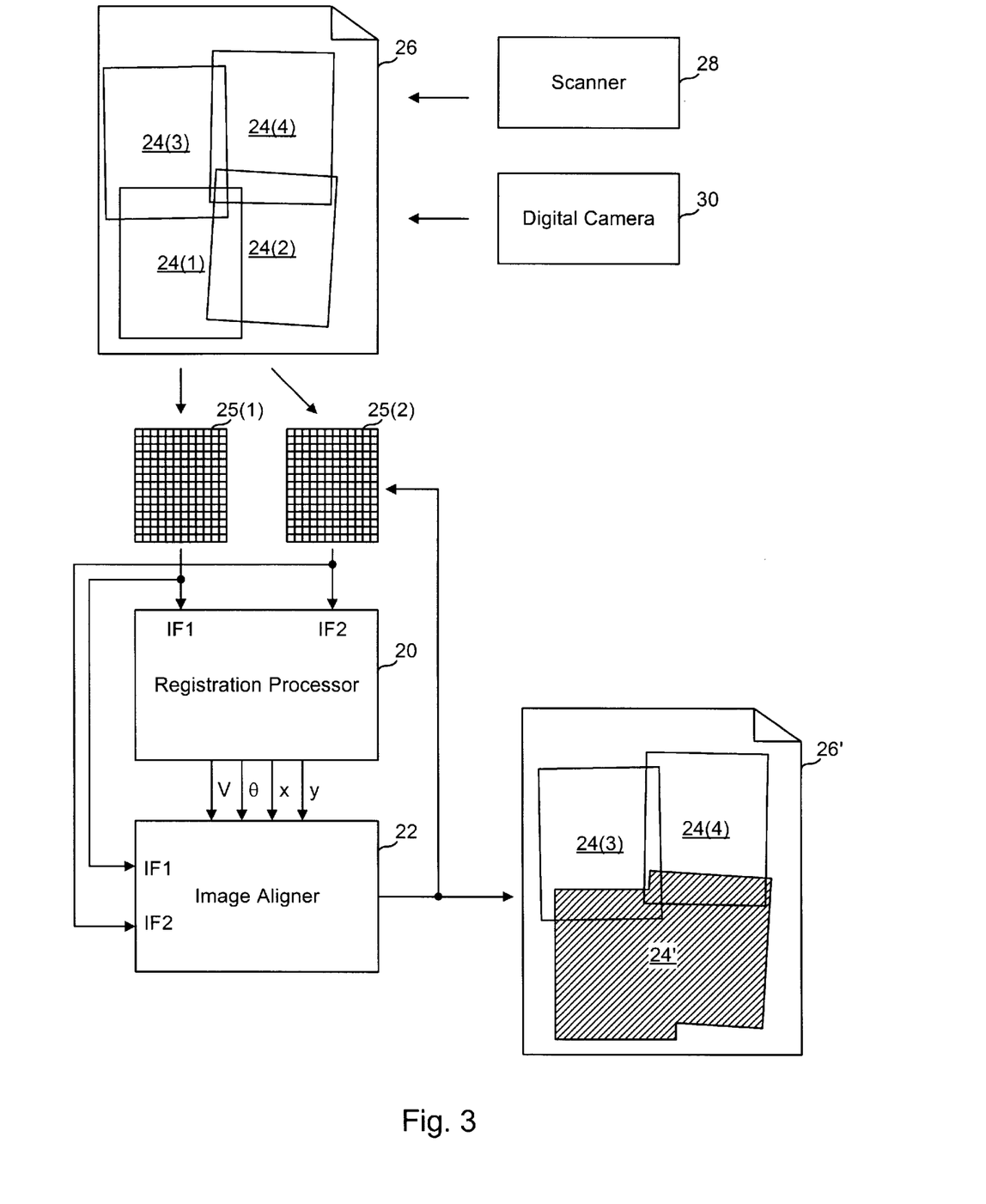
FIG. 3 is a block diagram of an image registration system.

The process of image registration according to the present invention has now been generally described. Referring now to FIG. 3, an apparatus for carrying out image registration is shown and will be described. The apparatus is shown comprising a registration processor 20 and an image aligner 22. Two image fragments 24(1) and 24(2) are shown as inputs to registration processor 20, and are generally stored as two-dimensional pixel value arrays 25(1), 25(2). These image fragments 24 are fragments of a larger image 26, which might be the result of multiple scans of image 26 by a scanner 28 or a digital camera 30. Interconnections for signals between the various elements are also shown in FIG. 3 and will be explained along with operation of the apparatus.

The operation illustrated in FIG. 3 is that of scanning image 26 four times, resulting in image fragments 24(1) to 24(4), and using registration processor 20 and image aligner 22 to combine two of the image fragments, 24(1) and 24(2) into a larger image fragment 24'. The larger image fragment 24' can then be fed back to be combined with other image fragments, such as image fragments 24(3) and 24(4).

The two image fragments are input to registration processor 20 as well as being input to image aligner 22. Based on the inputs, registration processor 20 outputs four signals, typically in the form of digital values. These four signals are a boolean validity signal (V), a rotation parameter (θ), a vertical translation (y) and a horizontal translation (x). The four signals are generated, more or less, as described in connection with the image alignment process shown in FIG. 2, with the validity signal indicating whether or not a lock was found at step S9 (see FIG. 2). The signals are output to image aligner 22, which uses the signals to form image fragment 24' from image fragments 24(1) and 24(2). If the validity signal V indicates that a lock was not found, image aligner 22 performs a conventional image registration process to form image fragment 24'.

If desired, image fragment 24' can be used as an input to registration processor 20 along with a new image fragment to form a larger image fragment and eventually registering all the image fragments into a representation of image 26.

The hardware used for registration processor 20 and image aligner 22 are not constrained by their function. They could be implemented using dedicated hardware, a specially designed integrated circuit chip or a collection of chips, or could be implemented entirely in software, i.e., by a conventional digital computer programmed according to the teachings herein.

Figure 4:
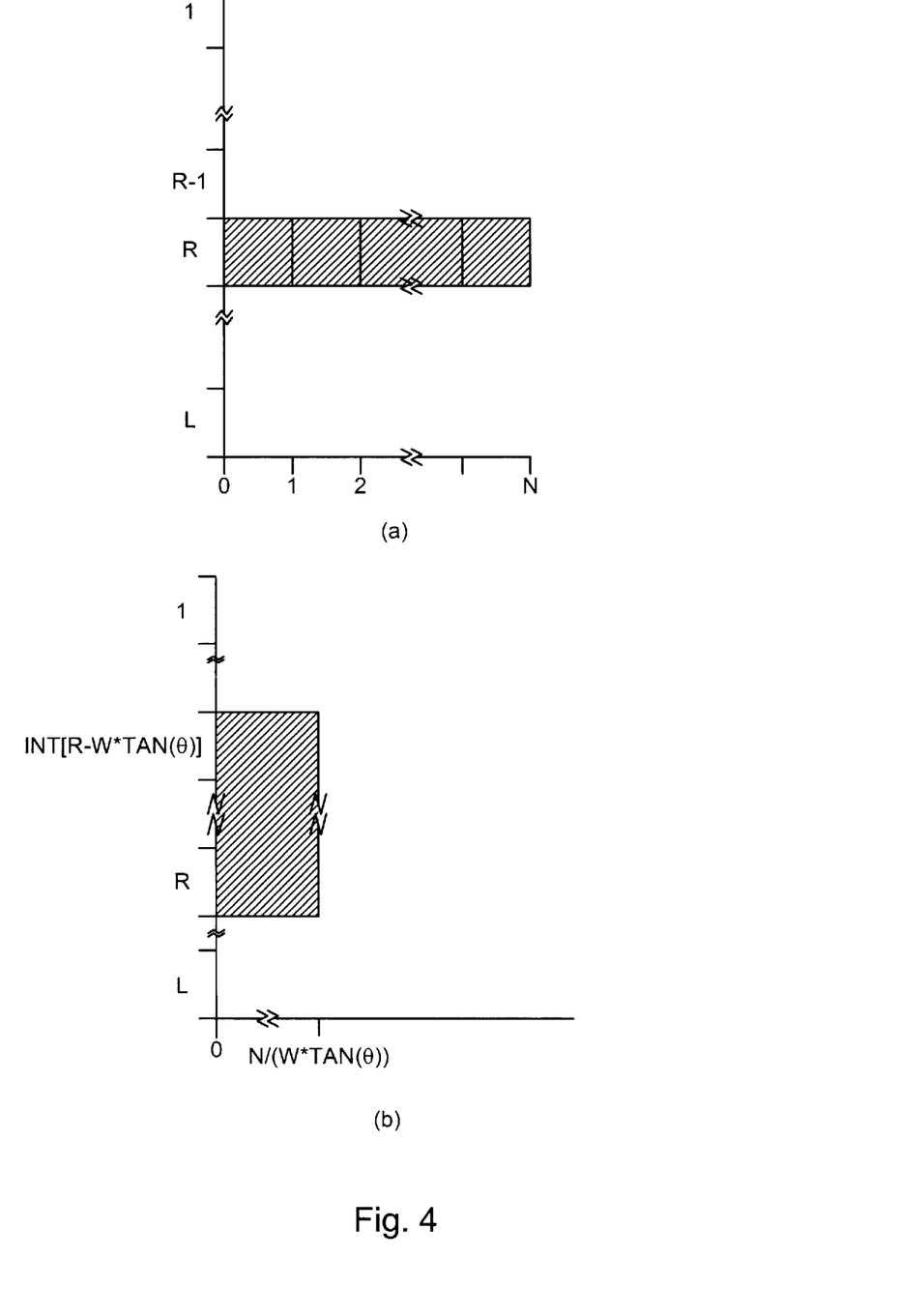
FIG. 4 graphically illustrates a process of rotating one bin of a histogram.

FIG. 4 illustrates a process of rotating a histogram. FIG. 4(a) shows a histogram of an image where only one row contains black pixels. The image, not shown, has L rows running from row 1 at the top to row L at the bottom. The one row with black pixels is row R, which has N black pixels, thus bin R of the histogram has the value N and all other bins of the histogram have are zero. As FIG. 4(b) shows, rotating the histogram of FIG. 4(a) is simply the process of spreading the N pixels in row R of the histogram over a range of W*tan(θ) where W is the width of the image.

As should be apparent, if the N black pixels are evenly distributed over row R, the resulting rotated histogram is the same as the histogram which would result if the image were rotated by the same angle and a histogram taken of the rotated image. If noninteger values for histogram bins are allowed, then the N pixels can be evenly distributed over the bins between bin R and the bin closest to R−W*tan(θ). If not, the pixels can be distributed as evenly as possible.

This method of rotating a histogram is equivalent to moving all the pixels of an image to an edge and then shearing the image. If desired, a closer simulation of rotating an image could be done, such as distributing the pixels over the range of bins closest to R*cos (θ) and R*cos (θ)−W*sin (θ).

EXPERIMENTAL RESULTS

Figure 5:
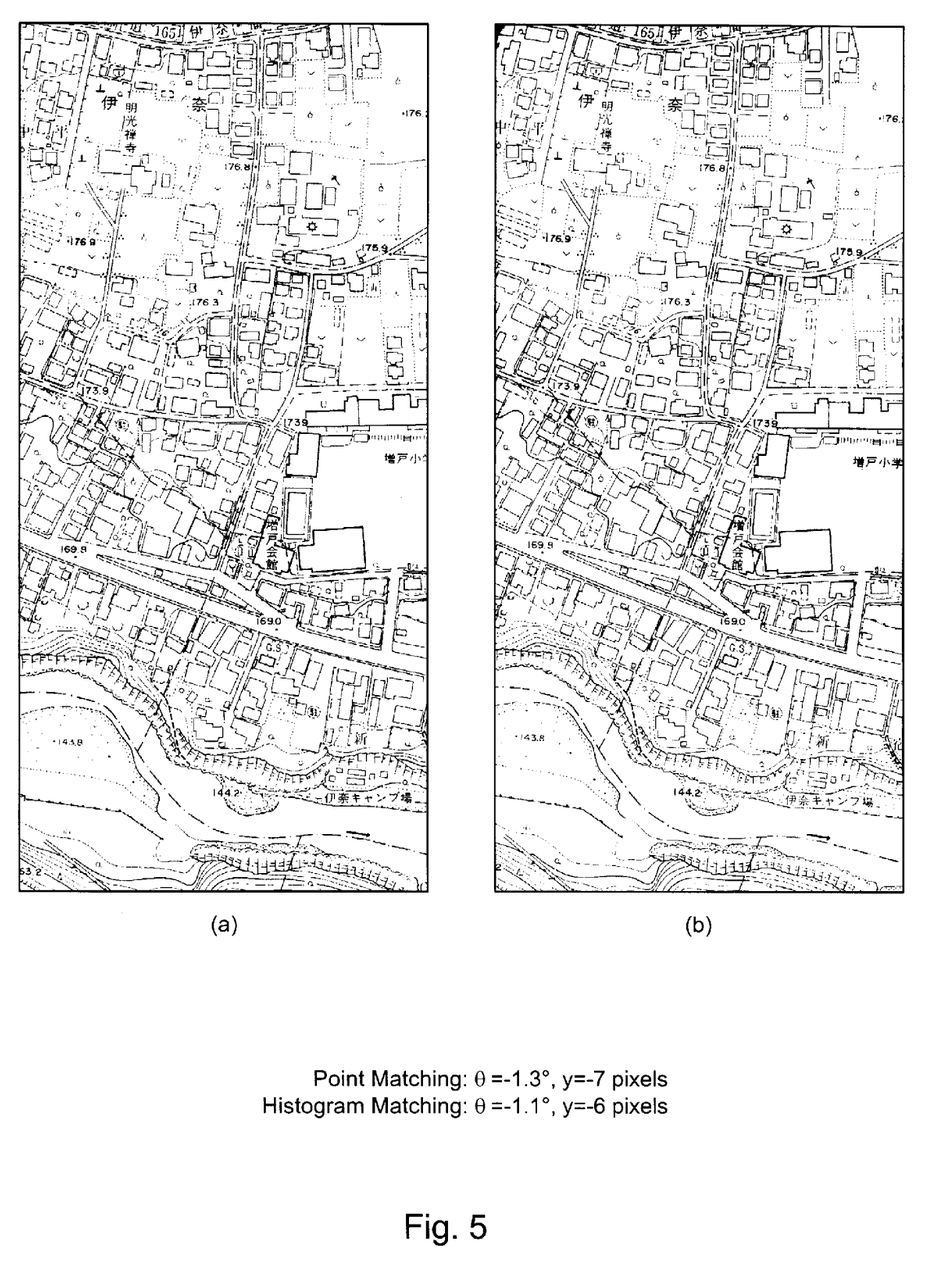
FIG. 5 is an illustration of two image fragments which can be registered to each other.

Histogram rotation was applied to image fragments taken from an urban map as shown in FIG. 5. The registration rotation and vertical translation parameters (θ,y) predicted using regular point matching were (−1.3°, −7 pixels) and with histogram matching were (−1.1°, −6 pixels).

The above description is illustrative and not restrictive. Many variations of the invention will become apparent to those of skill in the art upon review of this disclosure. Merely by way of example, the fragments can be either scanned images or image fragments matched to a larger image to identify a position of the image fragment within the larger image. The teachings of the above disclosure could also be applied to three-dimensional image fragment registrations. The scope of the invention should, therefore, be determined not with reference to the above description, but instead should be determined with reference to the appended claims along with their full scope of equivalents.

What is claimed is:

1. A method of registering two image fragments having a shared image portion, resulting in a transform with a rotation parameter, a first translation parameter and a second translation parameter, wherein the transform describes a rotation and a two-dimensional translation along a first axis and a second axis which, when applied to a first image fragment, maps the shared image portion of the first image fragment onto the corresponding shared image portion of the second image fragment, the method comprising the steps of:

inputting a first two-dimensional binary array representing the first image fragment;

inputting a second two-dimensional binary array representing the second image fragment;

generating a first projection histogram of the first two-dimensional binary array projected onto the first axis;

generating a second projection histogram of the second two-dimensional binary array projected onto the first axis;

determining the best fit values for the rotation parameter and the first translation parameter by:

(1) applying test parameters, comprising a test rotation parameter and a test first translation parameter, to the first projection histogram to generate a rotated, shifted projection histogram;

(2) comparing the rotated, shifted projection histogram to the second projection histogram to determine an error distance for the test parameters;

(3) repeating steps (1) and (2) at least once using different test parameters to determine a plurality of error distances for a plurality of test parameters: and (4) designating the test parameters associated with the lowest error distance of the plurality of error distances as the rotation and first translation parameters of the transformation;

designating one of the first image fragment and the second image fragment as being a stationary image fragment and designating the other as being a floating image fragment;

transforming the floating image fragment relative to the stationary image fragment by the rotation and first translation parameters to form an intermediate image fragment; and registering the intermediate image fragment with the stationary image fragment to determine the second translation parameter.

2. The method of claim 1, wherein the first image fragment is the stationary image fragment and the second image fragment is the floating image fragment.

3. The method of claim 1, wherein the first axis is a vertical axis, resulting in horizontal projection histograms.

4. The method of claim 1, wherein image fragments are multi-level images, further comprising a step of thresholding the image fragments to obtain binary array values for the first and second two-dimensional binary arrays.

5. The method of claim 1, wherein at least one of the two image fragments is selected from the group of aerial photographs, images of astronomical objects, engineering blueprints and maps.

6. The method of claim 1, wherein at least one of the two image fragments is a fragment of a document larger than a platen window.

7. The method of claim 1, wherein at least one of the two image fragments is stored as run length encoded streams encoded along lines parallel to the second axis and the step of generating either the first projection histogram or the second projection histogram comprises a step of adding run lengths of a pixel color of interest for each line.

8. The method of claim 7, wherein a line is one of a horizontal row one pixel high or a vertical column one pixel wide.

9. The method of claim 1, wherein a binary array comprises binary values representing white and black pixels and the first and second projection histograms are each histograms of black pixel counts of each line.

10. The method of claim 1, wherein rotating a projection histogram comprises the steps of:

determining a spread range which is a function of the width of the first image fragment multiplied by the tangent of an angle of rotation; and evenly distributing counts of each line in the projection histogram being rotated over a distribution range beginning with the row being distributed.

11. The method of claim 1, wherein rotating a projection histogram comprises the steps of:

simulating a hypothetical image fragment based on the projection histogram being rotated, wherein the hypothetical image fragment has pixel values evenly distributed in each line perpendicular to the axis of projection and has a hypothetical projection histogram equal to the projection histogram being rotated;

rotating the hypothetical image fragment; and generating a rotated projection histogram from a projection of the hypothetical image fragment.

12. The method of claim 1, wherein the error distance is a sum of the squared differences between histogram values.

13. The method of claim 1, further comprising a step of comparing the lowest error distance to a locked threshold, a locked threshold being an error distance beyond which two image fragments are deemed not to be successfully registered; and if the lowest error distance is greater than the locked threshold, determining the transform by point matching between the first image fragment and the second image fragment.

14. The method of claim 13, wherein the step of determining the transform by point matching uses, as a starting point, the test parameters designated in step (4).

15. The method of claim 1, wherein a plurality of candidate transforms are determined, each of the candidate transforms having a low error distance, the method further comprising the step of forming point matching to select a best transform from among the plurality of candidate transforms.

* * * * *